No. 818,120. PATENTED APR. 17, 1906.
A. O. REPPETO.
SAW JOINTER.
APPLICATION FILED AUG. 15, 1904.
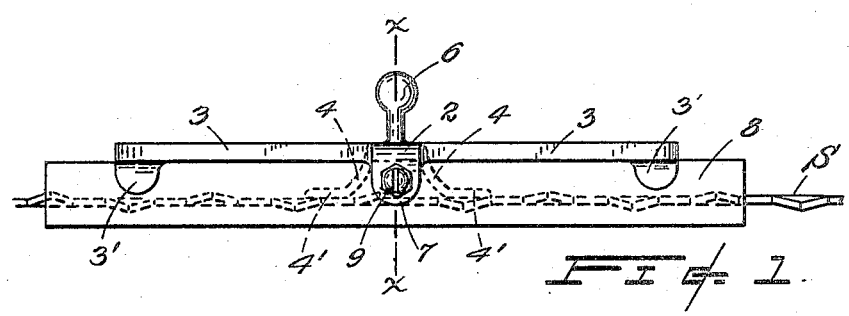
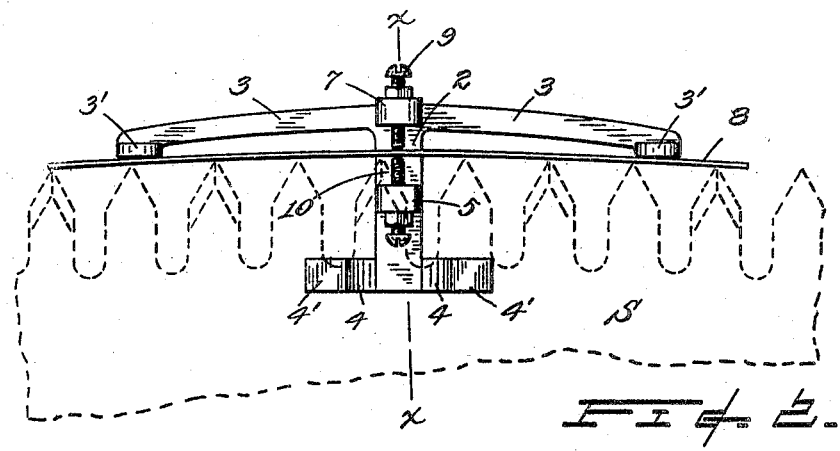
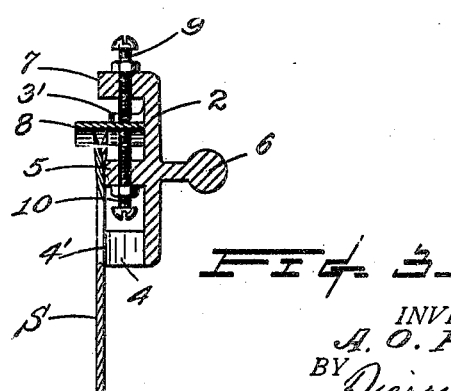
WITNESSES:
C. A. Bisber
Dudley Moss
INVENTOR.
A. O. Reppeto.
BY Pierre Barnes
ATTORNEY.

UNITED STATES PATENT OFFICE.

AUGUSTUS O. REPPETO, OF BLACHLY, OREGON.

SAW-JOINTER.

No. 818,120.     Specification of Letters Patent.     Patented April 17, 1906.

Application filed August 15, 1904. Serial No. 220,694.

*To all whom it may concern:*

Be it known that I, AUGUSTUS O. REPPETO, a citizen of the United States, residing at Blachly, in the county of Lane and State of Oregon, have invented certain new and useful Improvements in Saw-Jointers, of which the following is a specification, reference being had therein to the accompanying drawings.

This invention relates to that class of devices used for jointing or forming the cutting-teeth of a saw to uniform lengths either to a straight or curved line longitudinal of the saw; and it consists in the novel construction and combination of parts in a device which is adapted to accomplish that end, as hereinafter fully described in connection with the accompanying drawings, in which—

Figure 1 is a plan view of a device embodying my invention. Fig. 2 is a front elevation of the same, and Fig. 3 is a cross-section through $x\,x$ of Figs. 1 and 2.

Heretofore it has been customary in jointing saws to make use of files; but their use is attended with so many difficulties that the need for a better tool has been long felt. The most important of these difficulties reside in the fact that certain of the teeth after being filed down to desired heights are liable to be further lowered in trying to bring the adjoining group of teeth to correspond thereto, thus causing the points of the finished teeth to lie in an unfair or broken line. This is especially true when jointing a saw that has been used for some time, when the teeth toward the mid-length of the blade are worn to a greater extent than those near the extremities. These difficulties are overcome by the use of my device, as with it the teeth are jointed individually and without affecting the remaining teeth.

In carrying my invention into practice I provide a frame or stock comprising an upright shank 2, having in proximity to its upper and lower ends lateral arms 3 and 4, respectively. The lower of these arms are preferably curved, so as to present distended feet 4', which acting in conjunction with a protruding block 5 of the shank provide bearing-surfaces in the same plane adapted to be pressed against the saws being operated upon and hold the device firmly to its work, as may conveniently be done by providing a handle 6 on the back of the shank. The outer ends of the arms 3 are given rectangular bends to furnish forwardly-protruding bracket-lugs 3'. A lug 7 is positioned at the top of said shank and protrudes toward the front, as shown. 8 is a thin and smooth blade, preferably of hard steel, of somewhat greater width than the distance of the plane of said bearing-surfaces from the front face of the shank. This blade is held in the frame between the under side of the lugs 3' and the points of adjustable clamping-screws 9 and 10, extending through screw-threaded apertures, respectively, provided in lug 7 and block 5, whereby the blade may be adjustably deflected to conform with the curve at which it is desired to joint the points of the saw-teeth.

In use the device is placed against a saw held in a suitable vise or clamp, with the bearing-surfaces of the feet 4' and of the block 5 against the saw-blade and the blade 8 upon the saw-teeth, when by a blow with a hammer imparted upon the jointing-blade and delivered immediately above a high tooth will cause the same to be driven down. Usually a single blow will suffice to effect the desired lowering of a tooth. If not, the blow may be repeated until the tooth is at its proper height, and which can be readily determined by its touching the under side of the blade at the same time with the adjacent teeth previously jointed. It may be mentioned that after the teeth have been jointed or brought down to a uniform height the saw-filer dresses down the teeth to cutting-points, as usual.

Having described my invention, what I claim as new, and desire to secure by Letters Patent, is—

1. The combination with a frame having forwardly-protruding lugs, and an elastic jointing-blade, of means carried by the frame for clamping the said blade at its center, the ends of said blade extending under the said lugs of the frame and being free to move relatively thereto.

2. The combination with the frame having bent ends constituting forwardly-protruding lugs, and the elastic blade, of the adjustable clamping-screws arranged one on each side of the blade.

3. The combination with a frame comprising a shank having at one end laterally-extending arms terminating in bent ends and having at the other end additional laterally-extending arms, a block carried by said shank and a lug carried by said shank and opposing said block, screws passing through said lug and said block, of a flat, smooth, elastic blade secured between said screws and extending below said bent ends.

4. A frame comprising a shank having two sets of arms, one of said sets of arms having outwardly-bent ends, a block carried by said shank a lug carried by the shank and screws passing, respectively, through said block and lug, substantially as and for the purposes described.

5. In a saw-jointing tool, the combination with a frame of substantially T shape, having two arms extending laterally and provided with lugs on their ends, two adjusting-screws arranged in alinement and a flat elastic blade clamped between said adjusting-screws and extending under said lugs.

In testimony whereof I affix my signature in presence of two witnesses.

AUGUSTUS O. REPPETO.

Witnesses:
H. C. COMEGYS,
J. L. LYSONS.